(12) United States Patent
Kaneko

(10) Patent No.: US 10,196,945 B2
(45) Date of Patent: Feb. 5, 2019

(54) VALVE OPENING AND CLOSING TIMING CONTROL APPARATUS

(71) Applicant: AISIN SEIKI KABUSHIKI KAISHA, Kariya-shi, Aichi (JP)

(72) Inventor: Masaaki Kaneko, Aichi (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 53 days.

(21) Appl. No.: 15/319,018

(22) PCT Filed: Sep. 25, 2015

(86) PCT No.: PCT/JP2015/077163
§ 371 (c)(1),
(2) Date: Dec. 15, 2016

(87) PCT Pub. No.: WO2016/047768
PCT Pub. Date: Mar. 31, 2016

(65) Prior Publication Data
US 2017/0122139 A1    May 4, 2017

(30) Foreign Application Priority Data
Sep. 26, 2014   (JP) ................ 2014-196505

(51) Int. Cl.
*F01L 1/344*      (2006.01)
*F02D 41/08*      (2006.01)
(Continued)

(52) U.S. Cl.
CPC .......... *F01L 1/3442* (2013.01); *F01L 1/352* (2013.01); *F02D 13/0215* (2013.01);
(Continued)

(58) Field of Classification Search
CPC .. F02D 13/0234; F02D 41/221; F01L 1/3442; F01L 2001/34496; F01L 2800/11; F01L 2800/12
See application file for complete search history.

(56) References Cited

U.S. PATENT DOCUMENTS 4,231,330 A * 11/1980 Garcea ................ F01L 1/34406
                                                                 123/90.15
5,549,080 A *  8/1996 Uchikawa ........... F01L 1/34406
                                                                 123/198 D
(Continued)

FOREIGN PATENT DOCUMENTS

DE    10 2012 207 318 A1    11/2013
JP           2608070 B2       5/1997
(Continued)

OTHER PUBLICATIONS

Notification of Transmittal of Translation of the International Preliminary Report on Patentability (Forms PCT/IB/338 and PCT/IB/373) and the Written Opinion of the International Searching Authority (Form PCT/ISA/237) dated Oct. 20, 2015, by the International Bureau of WIPO in corresponding International Application No. PPCT/JP2015/077163. (9 pgs).

(Continued)

*Primary Examiner* — Erick Solis
(74) *Attorney, Agent, or Firm* — Buchanan Ingersoll & Rooney PC

(57) ABSTRACT

A valve opening and closing timing control apparatus includes a valve opening and closing timing control apparatus provided at a camshaft for an intake valve of an internal combustion engine and a valve opening and closing timing control apparatus provided at a camshaft for an exhaust valve and includes a control unit changing a phase of one of the valve opening and closing timing control apparatus for the intake valve and the valve opening and (Continued)

closing timing control apparatus for the exhaust valve serving as an electric type which malfunctions to a most advanced angle phase and changing a phase of the other of the valve opening and closing timing control apparatus which is inhibited from malfunctioning to an advanced angle side in a case where one of the valve opening and closing timing control apparatus serving as the electric type malfunctions.

4 Claims, 3 Drawing Sheets

(51) Int. Cl.
*F02P 5/15* (2006.01)
*F02D 13/02* (2006.01)
*F02D 41/22* (2006.01)
*F01L 1/352* (2006.01)
*F01L 1/053* (2006.01)
*F02D 41/00* (2006.01)

(52) U.S. Cl.
CPC ......... *F02D 13/0234* (2013.01); *F02D 41/08* (2013.01); *F02D 41/221* (2013.01); *F02P 5/15* (2013.01); *F02P 5/1508* (2013.01); F01L 2001/0537 (2013.01); F01L 2001/34463 (2013.01); F01L 2001/34496 (2013.01); F01L 2250/02 (2013.01); F01L 2250/04 (2013.01); F01L 2800/11 (2013.01); F01L 2800/12 (2013.01); F01L 2820/032 (2013.01); F01L 2820/041 (2013.01); F02D 13/0269 (2013.01); F02D 2041/001 (2013.01); F02D 2041/227 (2013.01); Y02T 10/142 (2013.01); Y02T 10/18 (2013.01); Y02T 10/46 (2013.01)

(56) References Cited

U.S. PATENT DOCUMENTS

| 5,664,529 | A * | 9/1997 | Kato | F01L 1/34406 |
| | | | | 123/90.15 |
| 5,738,053 | A * | 4/1998 | Kato | F01L 1/34406 |
| | | | | 123/90.15 |
| 6,318,313 | B1 * | 11/2001 | Moriya | F01L 1/34 |
| | | | | 123/90.15 |
| 6,505,586 | B1 * | 1/2003 | Sato | F02D 13/0234 |
| | | | | 123/90.15 |
| 7,159,548 | B2 * | 1/2007 | Shindou | F01L 1/344 |
| | | | | 123/90.15 |
| 9,334,762 | B2 * | 5/2016 | Kuffner | F01L 1/344 |
| 2003/0131814 | A1 * | 7/2003 | Tsujimura | F01L 1/34 |
| | | | | 123/90.17 |
| 2004/0187819 | A1 * | 9/2004 | Takenaka | F01L 1/022 |
| | | | | 123/90.17 |
| 2005/0027432 | A1 * | 2/2005 | Machida | F01L 1/34 |
| | | | | 701/107 |
| 2005/0217620 | A1 * | 10/2005 | Shindou | F01L 1/34 |
| | | | | 123/90.15 |
| 2006/0086338 | A1 * | 4/2006 | Kato | F01L 1/34 |
| | | | | 123/339.15 |
| 2006/0236960 | A1 * | 10/2006 | Nakamura | F01L 1/3442 |
| | | | | 123/90.15 |
| 2007/0209618 | A1 * | 9/2007 | Leone | B60K 6/24 |
| | | | | 123/90.12 |
| 2008/0091332 | A1 * | 4/2008 | Yasui | F02D 41/0002 |
| | | | | 701/102 |
| 2011/0023805 | A1 * | 2/2011 | Takemura | F01L 1/3442 |
| | | | | 123/90.17 |
| 2011/0271919 | A1 * | 11/2011 | Kaneko | F01L 1/3442 |
| | | | | 123/90.15 |
| 2012/0000437 | A1 * | 1/2012 | Ozawa | F01L 1/3442 |
| | | | | 123/90.15 |
| 2015/0053158 | A1 * | 2/2015 | Kobayashi | F01L 1/3442 |
| | | | | 123/90.18 |
| 2015/0152751 | A1 * | 6/2015 | Kuffner | F01L 1/352 |
| | | | | 123/90.17 |
| 2015/0211424 | A1 * | 7/2015 | Nomura | F02D 13/0238 |
| | | | | 123/472 |
| 2017/0074179 | A1 * | 3/2017 | Mikawa | F02D 41/26 |

FOREIGN PATENT DOCUMENTS

| JP | 2004-316635 A | | 11/2004 | |
| JP | 2006-307656 A | | 11/2006 | |
| JP | 2006307656 A | * | 11/2006 | ............ F01L 1/3442 |
| JP | 2013-007280 A | | 1/2013 | |
| JP | 2013-181488 A | | 9/2013 | |
| JP | 2014-105680 A | | 6/2014 | |

OTHER PUBLICATIONS

International Search Report (PCT/ISA/210) dated Oct. 20, 2015, by the Japanese Patent Office as the International Searching Authority for International Application No. PCT/JP2015/077163.

Written Opinion (PCT/ISA/237) dated Oct. 20, 2015, by the Japanese Patent Office as the International Searching Authority for International Application No. PCT/JP2015/077163.

* cited by examiner

1

VALVE OPENING AND CLOSING TIMING CONTROL APPARATUS

TECHNICAL FIELD

The present invention relates to a valve opening and closing timing control apparatus provided at an internal combustion engine.

BACKGROUND ART

A valve opening and closing timing control apparatus such as mentioned above is disclosed, for example, in Patent document 1. In the valve opening and closing timing control apparatus, in order to allow an internal combustion engine to start even in a case where a failure occurs, a phase of an electric valve opening and closing timing control apparatus provided at an intake valve is controlled to a most retarded angle side while a phase of a valve opening and closing timing control apparatus provided at an exhaust valve is controlled to a most advanced angle side.

In the internal combustion engine, in a case where the electric valve opening and closing timing control apparatus fails and a driving motor malfunctions, a rotation torque of a planetary gear in a planetary gear mechanism provided at the valve opening and closing timing control apparatus disappears. As a result, a ring gear operating in conjunction with a crankshaft of the internal combustion engine and a sun gear connected to a camshaft are inhibited from rotating in the same rotational period. Because the camshaft receives resistance by a spring provided at the intake valve, the camshaft to which a driving force is not transmitted is retarded relative to the ring gear and is arranged at a most retarded angle position at a mechanical stopper position.

In the internal combustion engine, even in a case where the camshaft is specified at a most retarded angle phase, the most retarded angle phase serves as an appropriate position for the start of the internal combustion engine. Thus, even when the electric valve opening and closing timing control apparatus malfunctions, the start of the internal combustion engine is achievable.

DOCUMENT OF PRIOR ART

Patent Document

Patent document 1: JP2004-316635A

OVERVIEW OF INVENTION

Problem to be Solved by Invention

For purposes of improving fuel consumption, for example, the internal combustion engine may employ an Atkinson cycle, for example, where the internal combustion engine operates in a state where the intake valve is further displaced to a retarded angle side after the start of the engine. According to such internal combustion engine, in a case where the intake valve is displaced to the most retarded angle phase upon failure of the valve opening and closing timing control apparatus as in the aforementioned known apparatus, restart of the internal combustion engine is impossible at the most retarded angle phase. Specifically, at a low temperature, an actual compression ratio of a cylinder is not secured so that an inside temperature of the cylinder is inhibited from increasing, which leads to decrease of ignition performance. Therefore, the aforementioned known technique is not applicable to recent various types of internal combustion engines and improvement may be required. It is desired to provide a valve opening and closing timing control apparatus which is applicable to various types of internal combustion engines and which includes improved startability.

Means for Solving Problem

According to a characteristic construction of a valve opening and closing timing control apparatus of the present invention, the valve opening and closing timing control apparatus includes an electric-type valve opening and closing timing control apparatus provided at least at one of a first camshaft for opening and closing an intake valve of an internal combustion engine and a second camshaft for opening and closing an exhaust valve of the internal combustion engine and a control unit changing a phase of the electric-type valve opening and closing timing control apparatus to a most advanced angle phase in a case where the electric-type valve opening and closing timing control apparatus malfunctions.

For example, in a case where the electric-type valve opening and closing timing control apparatus provided at the first camshaft for the intake valve malfunctions, the aforementioned electric-type valve opening and closing timing control apparatus is displaced to the most advanced angle phase so as to enhance compressibility of a cylinder at the internal combustion engine to achieve improved startability of the internal combustion engine. On the other hand, in a case where the electric-type valve opening and closing timing control apparatus provided at the second camshaft for the exhaust valve malfunctions and the aforementioned electric-type valve opening and closing timing control apparatus is changed to the most advanced angle phase, an appropriate phase in the exhaust valve for the start of the internal combustion engine is inherently on the side of the most advanced angle phase. Thus, the startability of the internal combustion engine does not greatly change by the aforementioned phase change. Accordingly, in the present construction, whichever the electric-type valve opening and closing timing control apparatus is positioned on the side of the intake valve or the exhaust valve, the electric-type valve opening and closing timing control apparatus is changed to the most advanced angle phase upon failure to thereby ensure the startability of the internal combustion engine.

In the other valve opening and closing timing control apparatus, in a case where the electric-type valve opening and closing timing control apparatus malfunctions, the control unit may be configured to increase an idle speed of the internal combustion engine to a predetermined speed.

As mentioned above, in a case where the phase of the electric-type valve opening and closing timing control apparatus which malfunctions is changed to the most advanced angle phase, a relative phase between the intake valve and the exhaust valve is out of an optimum relative phase for the start of the internal combustion engine. In order to compensate deterioration in startability of the internal combustion engine at that time, the idle speed of the internal combustion engine increases in the present construction. Accordingly, an amount of air-fuel mixture supplied to the cylinder increases to enhance combustion performance of the air-fuel mixture. The startability thus improves.

The other valve opening and closing timing control apparatus includes a camshaft sensor detecting a rotation angle of each of the first camshaft and the second camshaft integrally provided at an inner rotor and a crankshaft sensor detecting a rotation angle of a crankshaft synchronously rotating with an outer rotor that rotates coaxially with the inner rotor, the control unit being configured to accelerate an ignition timing of the internal combustion engine based on information detected by the camshaft sensor and the crankshaft sensor and a map stored beforehand at the control unit depending on a setting state of an opening and closing timing of each of the intake valve and the exhaust valve in a case where the electric-type valve opening and closing timing control apparatus malfunctions.

As mentioned above, in a case where the phase of the electric-type valve opening and closing timing control apparatus which malfunctions is changed to the most advanced angle phase, an amount of exhaust gas which mixes with air-fuel mixture within the cylinder varies. Thus, transmissibility of flame changes, which may deteriorate ignition performance. Therefore, in the present construction, the camshaft sensor is provided in the vicinity of each of the first camshaft and the second camshaft while the crankshaft sensor is provided in the vicinity of the crankshaft, for example, so as to obtain detection information therefrom. Further, the map is produced beforehand on a basis of a phase relationship of the shafts. The map is provided at the control unit, for example. According to such construction, opening and closing states of the intake valve and the exhaust valve and the position of the piston are obtainable. Optimum ignition timing is determinable on a basis of the aforementioned position relationship. That is, the acceleration of the ignition timing enhances a degree of combustion of air-fuel mixture to achieve the improved startability of the internal combustion engine.

In the other valve opening and closing timing control apparatus, a first valve opening and closing timing control apparatus is provided at the first camshaft and a second valve opening and closing timing control apparatus is provided at the second camshaft. In a case where one of the first valve opening and closing timing control apparatus and the second valve opening and closing timing control apparatus serving as the electric-type valve opening and closing timing control apparatus malfunctions and is changed to the most advanced angle phase and the other of the first valve opening and closing timing control apparatus and the second valve opening and closing timing control apparatus which is inhibited from malfunctioning is changeable to an advanced angle direction, the control unit changes a phase of the other of the first valve opening and closing timing control apparatus and the second valve opening and closing timing control apparatus to an advanced angle side so that an overlap period where an open period of the intake valve and an open period of the exhaust valve overlap each other obtained after the phase of the other of the first valve opening and closing timing control apparatus and the second valve opening and closing timing control apparatus which is inhibited from malfunctioning is changed to the advanced angle direction is shorter than an overlap period where the open period of the intake valve and the open period of the exhaust valve overlap each other obtained in a state where the electric-type valve opening and closing timing control apparatus which malfunctions is only controlled to the most advanced angle phase.

As in the present construction, the electric-type valve opening and closing timing control apparatus which malfunctions is changed to the most advanced angle phase while the other valve opening and closing timing control apparatus which is inhibited from malfunctioning is changed to the advanced angle side when possible so as to enhance compressibility of the cylinder at the internal combustion engine to achieve the improved startability of the internal combustion engine. In addition, because of no restraint caused by characteristics of the most retarded angle phase of the intake valve, application to various types of internal combustion engines is available. For example, in the internal combustion engine which employs an Atkinson cycle and where the phase of the intake valve at the start is specified at an intermediate position in a phase change range, the starting is impossible because a necessary compression ratio is not obtainable in a case where the phase of the intake valve is specified at the most retarded angle phase when the valve opening and closing timing control apparatus malfunctions. On the other hand, in the internal combustion engine which does not employ the Atkinson cycle and where it is configured that the starting is available when the intake valve is positioned at the most retarded angle phase, the internal combustion engine may start with no specific trouble even when the intake valve is specified at the most retarded angle phase at the failure. According to the present construction, in a case where the electric-type valve opening and closing timing control apparatus malfunctions, each of the apparatuses is changed to the advanced angle side so as not to be influenced by differences in types of the internal combustion engines. As a result, the valve opening and closing timing control apparatus which is applicable to various types of internal combustion engines is obtainable.

In the other valve opening and closing timing control apparatus, the first valve opening and closing timing control apparatus may be an electric type and the second opening and closing timing control apparatus may be a hydraulic type.

As in the present construction, the valve opening and closing timing control apparatus for the intake valve is the electric type which is configured not to employ hydraulic pressure as in an ordinary valve opening and closing timing control apparatus. Thus, the opening and closing timing of the intake valve is controllable even before the hydraulic pressure applied to each portion of the internal combustion engine sufficiently increases at the start thereof. Reliability of important intake control at the start of the internal combustion engine is enhanced. On the other hand, the valve opening and closing timing control apparatus for the exhaust valve is the hydraulic type so that the construction of the valve opening and closing timing control apparatus is simplified and compact as compared to the electric valve opening and closing timing control apparatus. A cost increase may be thus restrained without deteriorating mountability at the internal combustion engine.

MODE FOR CARRYING OUT THE INVENTION (Overview)

Figure 1:
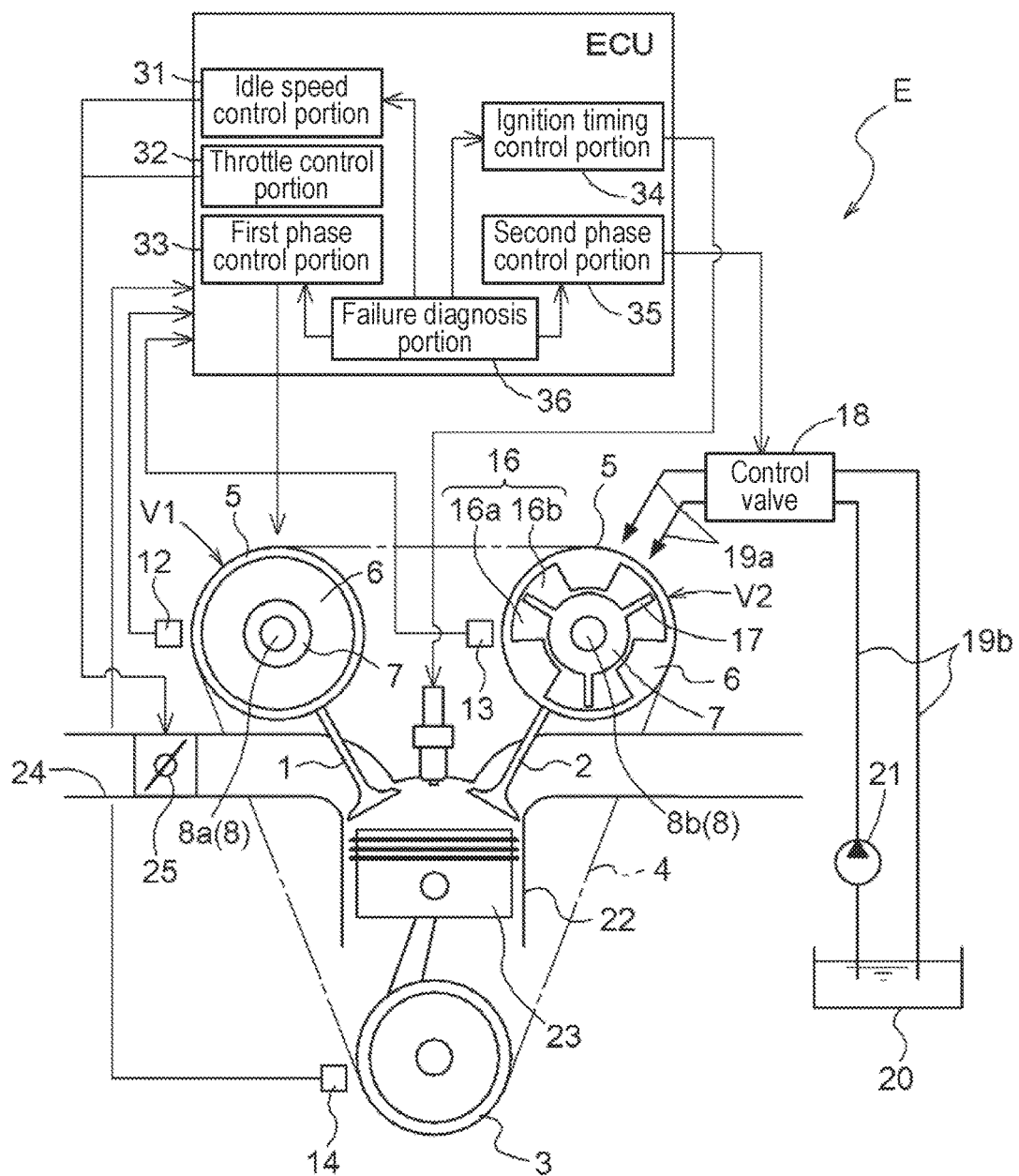
FIG. 1 is an explanatory view illustrating a construction of a valve opening and closing timing control apparatus according to an embodiment.

The present embodiment is explained with reference to FIGS. 1 to 5. FIG. 1 illustrates a condition around an internal combustion engine at which a first valve opening and closing timing control apparatus and a second valve opening and closing timing control apparatus according to the present embodiment are provided. In the following, the valve opening and closing timing control apparatus is referred to as a VVT (variable valve timing) and the internal combustion engine is referred to as an engine E.

As illustrated in FIG. 1, opening and closing timing of an intake valve 1 and opening and closing timing of an exhaust valve 2 are configured to be controlled by a first VVT V1 and a second VVT V2 respectively. In the embodiment, the first VVT V1 provided at the intake valve 1 is electrically operated while the second VVT V2 provided at the exhaust valve 2 is hydraulically operated. A port fuel injection gasoline engine or a direct injection gasoline engine with an L-Jetronic or D-Jetronic intake air measuring system, for example, is applicable to the engine E in the present embodiment.

In a case where a crankshaft 3 of the engine E is driven to rotate, a rotation power is transmitted via a power transmission member 4 to sprockets 5 provided at the first VVT V1 and the second VVT V2 respectively. Then, outer rotors 6 at which the sprockets 5 are provided respectively are driven so that rotation drive forces of the respective outer rotors 6 are transmitted to inner rotors 7 and camshafts 8 via gears to thereby drive the intake valve 1 and the exhaust valve 2.

(Electric VVT)

Figures 2, 3:
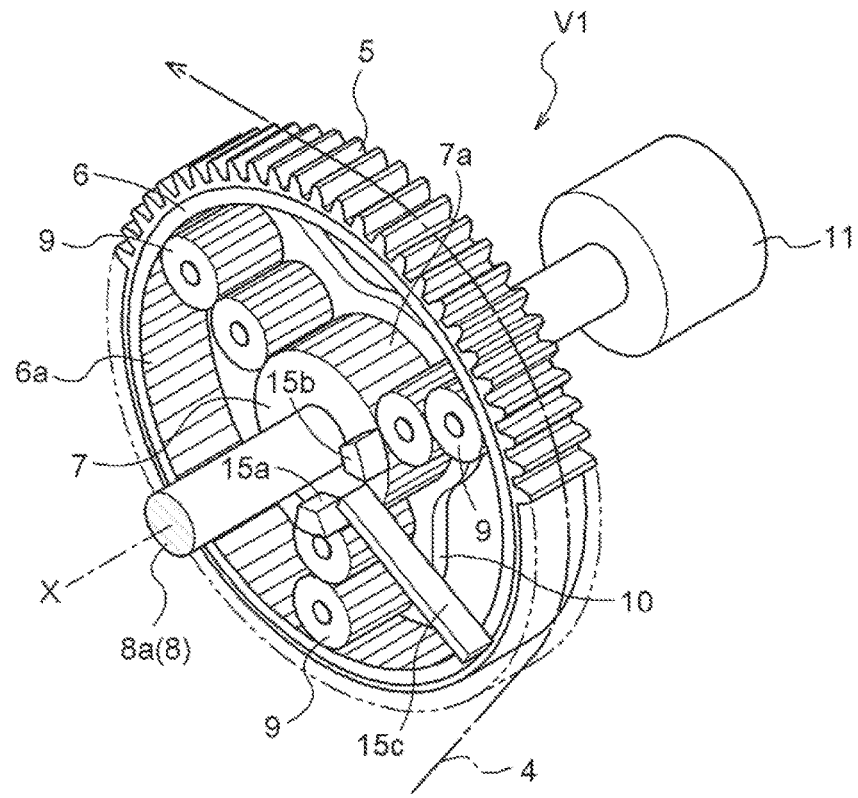
FIG. 2 is an explanatory view illustrating details of a driving force transmission mechanism of the valve opening and closing timing control apparatus.
FIG. 3 is an explanatory view illustrating a phase setting state of an intake valve and a phase setting state of an exhaust valve.

FIG. 2 is a schematic view of the first VVT V1 which is electrically operated. The first VVT V1 includes a planetary gear configuration. The rotation power from the crankshaft 3 is first input to the sprocket 5 provided at the outer rotor 6. The outer rotor 6 functioning as a ring gear includes inner teeth 6a at an inner peripheral surface. The inner rotor 7 functioning as a sun gear is provided at an end of the camshaft 8 which is provided coaxially with the outer rotor 6. Further, planetary gears 9 are provided in a manner being meshed with the inner teeth 6a of the outer rotor 6 and outer teeth 7a of the inner rotor 7. Three pairs of gear portions where two spur gears serve as a pair, for example, constitute the planetary gears 9 at a support plate 10. The support plate 10 is driven to rotate by a motor 11 which is coaxial with a rotation axis X of each of the outer rotor 6 and the inner rotor 7.

A rotation speed of the motor 11 is controlled by a first phase control portion 33 included in a control unit (ECU: Engine Control Unit) as illustrated in FIG. 1. Specifically, the rotation speed of the motor 11 is determined on a basis of detection values obtained by a first camshaft sensor 12 that detects a rotation phase of a first camshaft 8a opening and closing the intake valve 1, a second camshaft sensor 13 that detects the number of revolutions of a second camshaft 8b opening and closing the exhaust valve 2 and a crankshaft sensor 14 that detects a rotation phase of the crankshaft 3.

Rotation phases of the outer rotor 6 and the inner rotor 7 are maintained equal to each other by rotations of the planetary gears 9 at the same rotation speed as a rotation speed of the outer rotor 6. As a result, the outer rotor 6, the planetary gears 9 and the inner rotor 7 integrally rotate at the same speed. The camshaft 8 is displaced to an advanced angle direction by delaying the rotation speed of the planetary gear 9 relative to the rotation speed of the outer rotor 6. That is, the outer rotor 6 is brought to be advanced relative to the planetary gear 9 so that the pair of gears constituting the planetary gear 9 rotates to cause the inner rotor 7 to rotate faster than the planetary gear 9. At this time, the outer rotor 6 and the inner rotor 7 rotate relative to the planetary gear 9 by the same number of teeth as each other. Because the entire number of teeth of the outer rotor 6 is greater than the entire number of teeth of the inner rotor 7, a rotation angle of the inner rotor 7 is greater than a rotation angle of the outer rotor 6. That is, the inner rotor 7 is controlled to the advanced angle direction relative to the outer rotor 6. In a case of controlling the inner rotor 7 to a retarded angle direction, the planetary gear 9 may be controlled to be advanced relative to the outer rotor 6.

On the condition that the motor 11 malfunctions so that a driving force is inhibited from being transmitted to the planetary gears 9, a rotation speed of the support plate 10 at which the planetary gears 9 are provided decreases. On the other hand, the outer rotor 6 provided at an outer side of the planetary gears 9 continues rotating by a driving force input to the sprocket 5, which controls the inner rotor 7 to be displaced to the advanced angle direction via the planetary gears 9. A most advanced angle stopper 15a, a most retarded angle stopper 15b and an engagement portion 15c are provided at side surfaces of the inner rotor 7 and the outer rotor 6 so that the engagement portion 15c engages with each of the most advanced angle stopper 15a and the most retarded angle stopper 15b in a case where a phase of the inner rotor 7 is brought to each of a most advanced angle phase and a most retarded angle phase.

(Hydraulic VVT)

As illustrated in FIG. 1, an ordinary hydraulic VVT is employed as the second VVT V2. The second VVT V2 is hydraulically operated so that a construction of the second VVT V2 is simplified and compact as compared to the electric VVT. A cost increase may be thus restrained without deteriorating mountability at the internal combustion engine. The second VVT V2 includes the outer rotor 6 rotating synchronously with the crankshaft 3 and the inner rotor 7 arranged coaxially with the outer rotor 6 and integrally rotating with the second camshaft 8b. The outer rotor 6 is outwardly mounted to the inner rotor 7 so as to be rotatable relative to the inner rotor 7 within a predetermined phase range and includes the sprocket 5. The power transmission member 4 such as a timing chain and a timing belt, for example, is disposed among the aforementioned sprocket 5, the sprocket 5 provided at the outer rotor 6 for the intake valve and the sprocket provided at the crankshaft 3.

A void portion 16 is provided between the outer rotor 6 and the inner rotor 7. The void portion 16 is divided by a partition valve 17 which radially protrudes from the inner rotor 7 into an advanced angle chamber 16a and a retarded angle chamber 16b. A flow passage 19a is connected to the advanced angle chamber 16a and the retarded angle chamber 16b for supplying and discharging working fluid via a control valve 18. In addition, another flow passage 19b including a pump 21 for supplying and discharging the fluid relative to a fluid storage portion 20 is connected to the control valve 18. Specifically, a second phase control portion 35 of the ECU controls and switches the position of the control valve 18 so that a control for supplying the fluid at the fluid storage portion 20 to one of the advanced angle chamber 16a and the retarded angle chamber 16b and for discharging the fluid from the other of the advanced angle chamber 16a and the retarded angle chamber 16b is performed. A relative rotational phase of the inner rotor 7 is changed accordingly.

(Other Constructions)

Though illustrations are omitted, a lock mechanism which fixes a relative phase between the outer rotor 6 and the inner rotor 7 is provided at the hydraulic VVT. That is, the lock mechanism which may lock a relative rotation between the rotors in a case where a relative rotation phase of the rotors is positioned at a predetermined intermediate lock phase specified between the most advanced angle phase and the most retarded angle phase is provided between the inner rotor 7 and the outer rotor 6. Upon starting of the engine E, the VVT is specified at the aforementioned intermediate lock phase to thereby obtain improved startabiliy. The present embodiment is also applicable to the VVT where the intermediate lock phase is not provided.

The lock mechanism is controlled hydraulically, however, various types of controls are available. For example, the working fluid supplied and discharged relative to the advanced angle chamber 16a and the retarded angle chamber 16b is usable or a working fluid flow passage and a switching valve provided exclusively for locking may be provided independently from the control to the advanced angle direction or the retarded angle direction.

(VVT Operation)

In a case where the electric-type first VVT V1 provided for the intake valve malfunctions, for example, the second VVT V2 is operated as below. A left diagram in FIG. 3 illustrates opening and closing timing of the intake valve 1 and the exhaust valve 2 at the engine start in a case where the first VVT V1 for the intake valve 1 and the second VVT V2 for the exhaust valve 2 operate normally. A right drawing in FIG. 3 illustrates opening and closing timing of the intake valve 1 and the exhaust valve 2 at the engine start in a case where the first VVT V1 malfunctions. When the first VVT V1 malfunctions, the planetary gears 9 are inhibited from being driven. Thus, the rotations of the planetary gears 9 are delayed relative to the outer rotor 6, which displaces the first camshaft 8a that is integrally provided with the inner rotor 7 to the most advanced angle phase. The most advanced angle phase is mechanically determined by the engagement portion 15c that is provided over the outer rotor 6 and the inner rotor 7 and the most advanced angle stopper 15a. In a case where the rotation phase of the first camshaft 8a is not appropriate, failure is detected based on an output from each of the first camshaft sensor 12 at the intake side, the second camshaft sensor 13 at the exhaust side and the crankshaft sensor 14. Based on the aforementioned detection result, a failure diagnosis portion 36 of the ECU controls the second VVT V2 in a normal state to the advanced angle direction in a case where the second VVT V2 is changeable further to the advanced angle direction.

The displacement of the first VVT V1 which is in the failure state to the most advanced angle phase as mentioned above enhances compressibility of a cylinder 22 to achieve improved startability of the internal combustion engine. After the relative rotation phase of the intake valve 1 is brought to the most advanced angle phase, the relative rotation phase of the exhaust valve 2 is changed to a phase appropriate for the most advanced angle phase of the intake valve 1. As a result, an overlap period where an open period of the intake valve 1 and an open period of the exhaust valve 2 overlap each other is changed to be shorter than an immediately previous overlap period. That is, the overlap period where the open period of the intake valve 1 and the open period of the exhaust valve 2 overlap each other obtained after the phase of the second VVT V2 which is inhibited from malfunctioning is changed to the advanced angle direction is shorter than the overlap period obtained in a state where the electric-type first VVT V1 which malfunctions is only controlled to the most advanced angle phase. As a result, the overlap period is inhibited from excessively increasing to thereby appropriately enhance compressibility of the cylinder 22 to ensure the start of the internal combustion engine.

At this time, however, in a case where the overlap period where the open period of the intake valve 1 and the open period of the exhaust valve 2 overlap each other is inhibited from being shorter than the immediately previous overlap period because of a specification of the engine E, the overlap period after the phase change of the second VVT V2 may be the same as or longer than the immediately previous overlap period. In this case, idle speed or ignition timing of the engine is changed to avoid an engine stall.

Specifically, as in the present construction, because the first VVT V1 at the intake valve 1 is electrically operated so as not to use hydraulic pressure as in the usual VVT, the opening and closing timing of the intake valve 1 is appropriately controllable even before the hydraulic pressure applied to each portion of the internal combustion engine sufficiently increases at the start thereof. Therefore, reliability of important intake control at the start of the internal combustion engine is enhanced.

Further, the first VVT V1 is displaced to the most advanced angle phase when the first VVT V1 malfunctions so that restraint caused by characteristics of the most retarded angle phase of the intake valve 1 is inhibited. Thus, the embodiment is easily applicable to the various types of internal combustion engines. For example, in the internal combustion engine which employs an Atkinson cycle and where the phase of the intake valve 1 at the start is specified at an intermediate position in a phase change range, the starting is impossible because a necessary compression ratio is not obtainable in a case where the phase of the intake valve 1 is specified at the most retarded angle phase as in the aforementioned known technique when the first VVT V1 malfunctions. On the other hand, in the internal combustion engine which does not employ the Atkinson cycle and where it is configured that the starting is available when the intake valve 1 is positioned at the most retarded angle phase, the internal combustion engine may start with no specific trouble even when the intake valve is specified at the most retarded angle phase at the failure. Accordingly, the engine E to which the intake valve 1 that is controlled to the most retarded angle phase is applicable is limited. On the other hand, according to the first VVT V1 of the embodiment, the phase of the intake valve 1 upon failure thereof is specified at the most advanced angle position. Thus, the first VVT V1 is not influenced by differences in types of the internal combustion engines. As a result, the VVT which is applicable to various types of internal combustion engines is obtainable.

(Idle Speed-Up Control)

Figure 4:
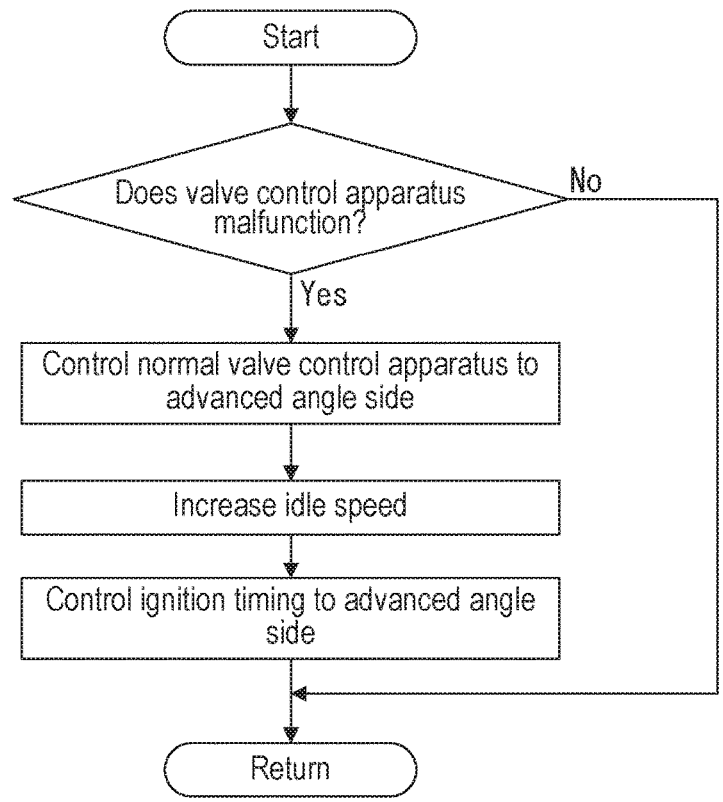
FIG. 4 is a flowchart illustrating a control of the valve opening and closing timing control apparatus.
Figure 5:
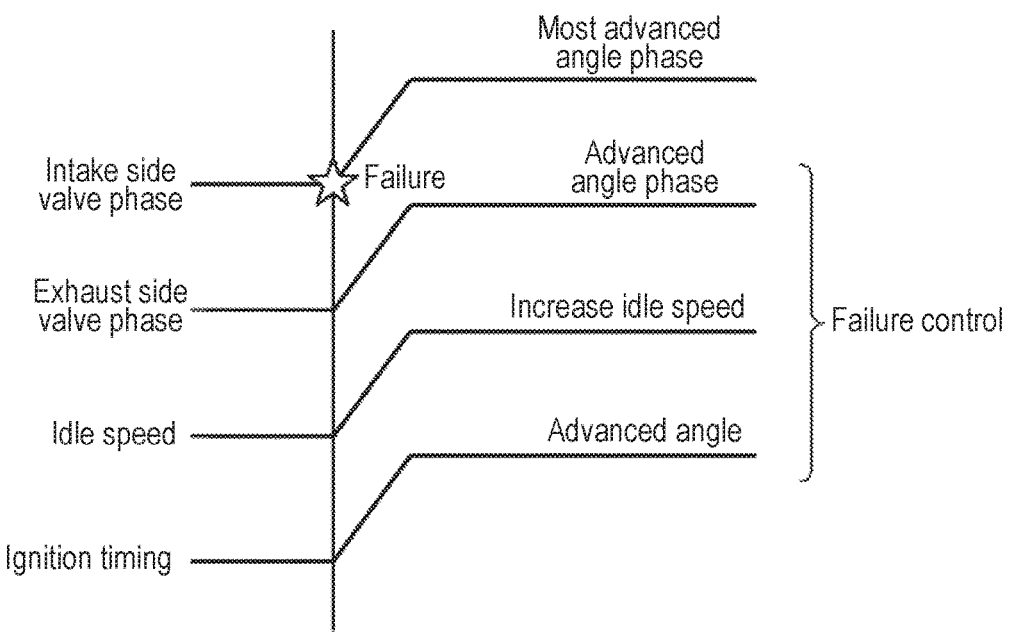
FIG. 5 is a time chart illustrating the control of the valve opening and closing timing control apparatus.

As illustrated in FIGS. 4 and 5, in the present embodiment, the idle speed of the engine E may increase at the stage of detecting failure of the electric-type first VVT V1 by the ECU. That is, even in a case where an overlap amount between the intake valve 1 and the exhaust valve 2 is controlled, the overlap amount may be inhibited from being optimum. For example, when the overlap amount is large, a portion of exhaust air mixes with intake air, which may lead to deterioration in combustion performance. Specifically, the aforementioned influence may increase in a case where the engine E performs a low-revolution operation under a high temperature. Idle stability of the engine is inferior as compared to the VVT in a normal state. In order to improve such condition, the idle speed increases as in the present embodiment so that an amount of air-fuel mixture supplied to the cylinder 22 increases to enhance the combustion performance of the air-fuel mixture. The idle stability thus improves.

In order to increase the idle speed, as illustrated in FIG. 1, an opening degree of a throttle valve 25 which is provided at an intake passage 24 for controlling an intake flow amount is controlled by an idle speed control portion 31 and a throttle control portion 32 provided at the ECU. A degree of increase of speed is such that the engine E is inhibited from stopping and suddenly starting, for example, i.e., the vehicle can be driven to a nearby repair garage with a minimum driving performance. Specifically, approximately 2,000 RPM is desirable.

(Advanced Angle Control of Ignition Timing)

In the present embodiment, as illustrated in FIGS. 4 and 5, an ignition timing control portion 34 of the ECU may be configured to accelerate ignition timing of the internal combustion engine depending on a setting state of opening and closing timing of each of the intake valve 1 and the exhaust valve 2 in a case where the electric-type first VVT V1 malfunctions.

Even in a case where the overlap amount between the intake valve 1 and the exhaust valve 2 is controlled as mentioned above, an amount of exhaust gas which mixes with air-fuel mixture within the cylinder 22 varies. Thus, transmissibility of flame changes, which may deteriorate ignition performance. Therefore, as in the present construction, the ignition timing is accelerated to increase a degree of combustion of air-fuel mixture to achieve the improved startability of the internal combustion engine.

Ignition timing is determined on a basis of rotation position information of each of the shafts obtained by the first camshaft sensor 12 and the second camshaft sensor 13 provided near the first camshaft 8a and the second camshaft 8b respectively, and the crankshaft sensor 14. For example, map is produced beforehand on a basis of the overlap amount between the intake valve 1 and the exhaust valve 2, for example, and an advanced angle control is performed on the ignition timing based on the aforementioned map. The ignition timing of the engine E may be accelerated by the advanced angle control. Further, the aforementioned ignition timing may be finely adjusted on a basis of an amount of exhaust gas recirculation (EGR) within the cylinder 22.

Further, in a case where the electric-type first VVT V1 malfunctions, a mixing ratio of fuel may be changed. The mixing ratio between air and fuel for usual air-fuel mixture, i.e., air-fuel ratio, is approximately 14.7:1. Such air-fuel ratio may be changed to 12:1, for example, to increase a ratio of fuel. Accordingly, the ignition performance of air-fuel mixture increases to improve the engine startability when the first VVT V1 malfunctions.

[Other Embodiments]

The aforementioned electric VVT may be employed for the exhaust valve 2 in addition to the intake valve 1. Alternatively, the electric VVT may be employed only for the exhaust valve and the hydraulic second VVT V2 may be employed for the intake valve. On the condition that the electric-type second VVT V2 malfunctions, the second VVT V2 is controlled to the most advanced angle phase. At this time, in the exhaust valve 2, however, the phase at the normal start is specified at the exhaust air side. Thus, the starting state does not greatly change even when the exhaust valve 2 is displaced to the most advanced angle phase. Thus, in this case, the phase of the intake valve 1 which does not malfunction is not necessarily greatly displaced in the advanced angle direction and may be displaced to an appropriate phase in the advanced angle direction so as to obtain the optimum engine start based on the most advanced angle phase of the exhaust valve 2.

Further, in a case where the electric VVT is provided at the intake valve 1 and the exhaust valve 2 is not equipped with the VVT, the electric VVT may be configured to be displaced to the most advanced angle phase when the electric VVT malfunctions. In this case, in order to increase the startability of the engine E, the control for increasing the idle speed or the control for accelerating the ignition timing may be applied together.

In addition, the first VVT V1 may not be provided at the intake valve 1 and only the second VVT V2 may be provided at the exhaust valve 2. In this case, as an initial setting at the engine start, the exhaust valve 2 is positioned on the advanced angle side. Thus, no specific trouble may occur even when the second VVT V2 malfunctions. At this time, however, in a case where the most advanced angle phase of the exhaust valve 2 slightly differs from an initial starting phase, the idle speed-up control or the early control of the ignition timing may be desirably performed.

INDUSTRIAL AVAILABILITY

The present invention is widely applicable to an internal combustion engine where a VVT is provided at a first camshaft for an intake valve and a VVT is provided at a second camshaft for an exhaust valve.

EXPLANATION OF REFERENCE NUMERALS 1 intake valve
2 exhaust valve
3 crankshaft
6 outer rotor
7 inner rotor
8a first camshaft for intake valve
8b second camshaft for exhaust valve
12 first camshaft sensor
13 second camshaft sensor
14 crankshaft sensor
ECU control unit
V1 first valve opening and closing timing control apparatus
V2 second valve opening and closing timing control apparatus

The invention claimed is:

1. A valve opening and closing timing control apparatus comprising:
    an electric-type valve opening and closing timing control apparatus provided at least at one of a first camshaft for opening and closing an intake valve of an internal combustion engine and a second camshaft for opening and closing an exhaust valve of the internal combustion engine; and
    a control unit changing a phase of the electric-type valve opening and closing timing control apparatus to a most advanced angle phase in a case where the electric-type valve opening and closing timing control apparatus malfunctions,
    wherein a first valve opening and closing timing control apparatus is provided at the first camshaft and a second valve opening and closing timing control apparatus is provided at the second camshaft, and
    in a case where one of the first valve opening and closing timing control apparatus and the second valve opening and closing timing control apparatus serving as the electric-type valve opening and closing timing control apparatus malfunctions and is changed to the most advanced angle phase and the other of the first valve opening and closing timing control apparatus and the second valve opening and closing timing control apparatus which is inhibited from malfunctioning is changeable to an advanced angle direction, the control unit changes a phase of the other of the first valve opening and closing timing control apparatus and the second valve opening and closing timing control apparatus to an advanced angle side so that an overlap period where an open period of the intake valve and an open period of the exhaust valve overlap each other obtained after the phase of the other of the first valve opening and closing timing control apparatus and the second valve opening and closing timing control apparatus which is inhibited from malfunctioning is changed to the advanced angle direction is shorter than an overlap period where the open period of the intake valve and the open period of the exhaust valve overlap each other obtained in a state where the electric-type valve opening and closing timing control apparatus which malfunctions is only controlled to the most advanced angle phase.

2. The valve opening and closing timing control apparatus according to claim 1, wherein the control unit increases an idle speed of the internal combustion engine to a predetermined speed in a case where the electric-type valve opening and closing timing control apparatus malfunctions.

3. The valve opening and closing timing control apparatus according to claim 1, further comprising:
a camshaft sensor detecting a rotation angle of each of the first camshaft and the second camshaft;
a crankshaft sensor detecting a rotation angle of a crankshaft;
an outer rotor rotating synchronously with the crankshaft of the internal combustion engine; and
an inner rotor arranged coaxially with the outer rotor and rotatably supported at the outer rotor, wherein
the control unit accelerates an ignition timing of the internal combustion engine based on information detected by the camshaft sensor and the crankshaft sensor and a map stored beforehand at the control unit depending on a setting state of an opening and closing timing of each of the intake valve and the exhaust valve in a case where the electric-type valve opening and closing timing control apparatus malfunctions.

4. The valve opening and closing timing control apparatus according to claim 1, wherein the first valve opening and closing timing control apparatus is an electric type and the second opening and closing timing control apparatus is a hydraulic type.

* * * * *